Dec. 25, 1962 F. HANSELMANN 3,070,075
TWIN-CYLINDER FLUID MOTOR WITH PENDULUM PISTON
Filed May 3, 1960 6 Sheets-Sheet 1

INVENTOR
FRANK HANSELMANN
BY *[signature]*
AGENT

Dec. 25, 1962 F. HANSELMANN 3,070,075
TWIN-CYLINDER FLUID MOTOR WITH PENDULUM PISTON
Filed May 3, 1960
6 Sheets-Sheet 2

INVENTOR.
FRANK HANSELMANN

By Kurt Kelman

AGENT.

Dec. 25, 1962     F. HANSELMANN     3,070,075
TWIN-CYLINDER FLUID MOTOR WITH PENDULUM PISTON
Filed May 3, 1960     6 Sheets-Sheet 3

INVENTOR
FRANK HANSELMANN
BY [signature]
AGENT

INVENTOR
FRANK HANSELMANN
BY [signature]
AGENT

INVENTOR
FRANK HANSELMANN
BY

Dec. 25, 1962 F. HANSELMANN 3,070,075
TWIN-CYLINDER FLUID MOTOR WITH PENDULUM PISTON
Filed May 3, 1960 6 Sheets-Sheet 6

INVENTOR
FRANK HANSELMANN
BY [signature]
AGENT

United States Patent Office 3,070,075
Patented Dec. 25, 1962

3,070,075
TWIN-CYLINDER FLUID MOTOR WITH
PENDULUM PISTON
Frank Hanselmann, Seestrasse, Stafa,
near Zurich, Switzerland
Filed May 3, 1960, Ser. No. 26,635
Claims priority, application Germany May 19, 1959
15 Claims. (Cl. 121—97)

The present invention relates to fluid motors in general, and more particularly to improvements in hydraulic or pneumatic double acting twin-cylinder motors which utilize a pendulum piston.

Double acting twin-cylinder hydraulic or pneumatic motors are preferred in many operations which require comparatively slow oscillatory or rotary movements of one or more driven components. Such motors are of comparatively simple construction and may be conveniently regulated without any losses to operate between zero and maximum speed. In addition, depending upon the fluid pressure, even a small motor can generate substantial forces, and the dimensions of such motors may be varied within a very wide range. For example, a comparatively small motor may be utilized to operate the windshield wipers in an automotive vehicle, while a much larger fluid motor of substantially the same type may serve as a means for operating large mixers in chemical plants and the like. A further important advantage of such fluid motors is their low maintenance cost, low initial cost, as well as that they may be used in certain branches of chemical industry where a spark could cause dangerous explosions.

Certain double acting fluid motors of known construction which utilize a pendulum piston comprise annular cylinders consisting of two halves which are joined face-to-face to form a cylinder space for the pendulum piston. It has been found that such cylinders are hard to seal and that the seams formed along the meeting edges of their end faces bring about rapid destruction of packing rings on the piston. Slightly modified motors of this general character are utilized in certain washing machines and are operated by water pressures not exceeding 6 atmospheres. Such motors cannot stand higher pressures and, therefore, are not sufficiently versatile for use in many branches of the industry.

An object of the present invention is to provide an improved fluid motor which may be manufactured in all sizes without requiring changes in its basic design and which is capable of operating not only at comparatively low but also at very high pressures of up to and even higher than 300 atmospheres.

Another object of the invention is to provide a fluid motor of the afore-described characteristics wherein the mounting of the cylinders is such that they can withstand extremely high pressures, and whose output may be readily varied between zero and maximum magnitude.

A further object of the instant invention is to provide a hydraulic or pneumatic motor operating with two arcuate cylinders and a pendulum type piston whose output, even at very small dimensions of its component parts, is extremely high and whose cylinders may be constructed of a synthetic plastic material even if the motor is operated at very high pressures.

A concomitant object of the invention is to provide a fluid motor of the above outlined characteristics which is of very simple and compact design, which comprises a small number of component parts, which may be readily taken apart for inspection, repair or replacement of its parts, which requires little or no attention when in actual use, and which may form with the fluid flow regulating system a self-supporting unit of small dimensions.

An additional object of the invention is to provide a twin-cylinder fluid motor of the pendulum piston type which can be utilized to produce an oscillatory, a reciprocatory, or a rotary motion.

With the above objects in view, the invention resides in the provision of a fluid motor which comprises a substantially segment shaped center support to serve as a means for articulately mounting two arcuate open-ended cylinders each of which receives one head of a pendulum type piston, the latter being mounted for oscillatory movements about the common center of curvature of the cylinders. The mutually inclined end faces of the center support seal one open end of each cylinder, and the cylinders have at least slight freedom of movement with respect to the center support so that they may yield, within a predetermined range, to certain expanding forces which are generated by the pressure fluid and which vary as the piston oscillates; moreover, the cylinders may yield to certain stresses which arise if the motor is operated at different temperatures.

The center support constitutes a rigid block for both cylinders; therefore, the cylinders may consist of a comparatively soft but highly wear and corrosion resistant synthetic plastic material, such as filter-reinforced polyester material or the like. The fluid flow regulating valve system is preferably mounted in the center support which may also carry the pivot axle of the pendulum piston. By mounting the valving in the center support, the fluid travels only a short distance on its way to the cylinders and the rigid center support takes up all forces arising when the piston oscillates.

The invention will be described in greater detail with reference to the accompanying drawings, in which.

Figure 1:
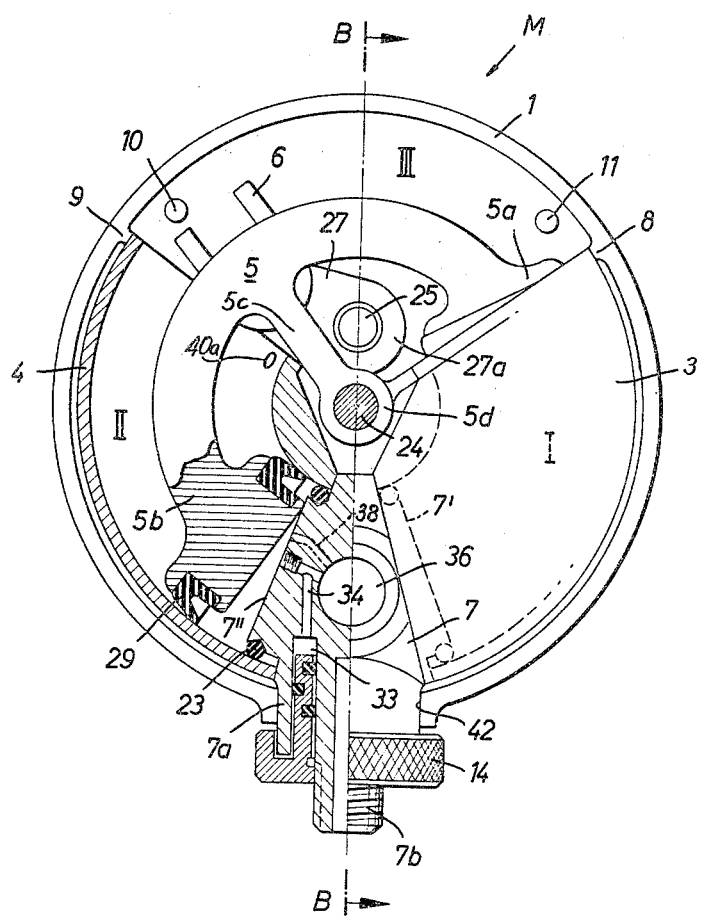
FIG. 1 is a plan view of a motor embodying one form of my invention as seen from the right-hand side of FIG. 2 in the direction of arrow A, a portion of the motor casing being broken away and certain parts mounted in the left-hand half of the casing being shown in section.
Figure 1A:
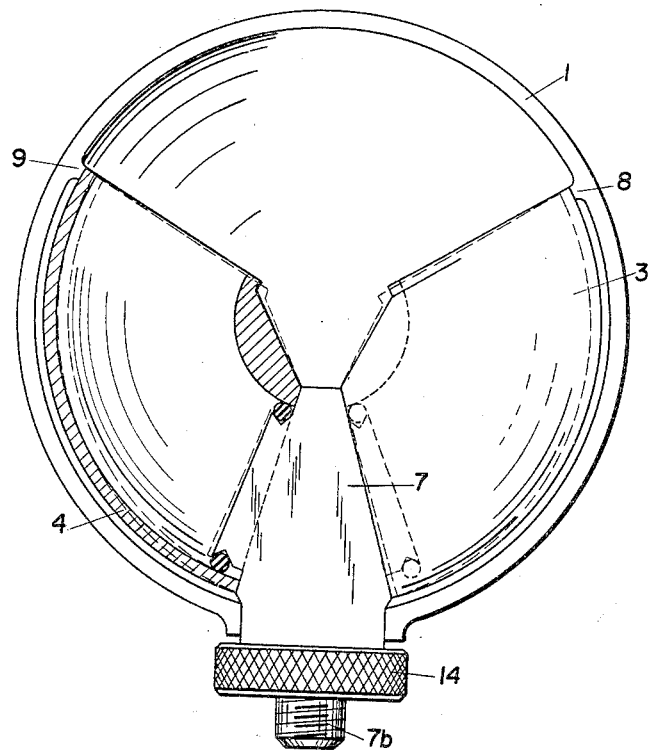
FIG. 1a shows certain elements of the apparatus of FIG. 1 to illustrate the movement of the cylinders.
Figure 2:
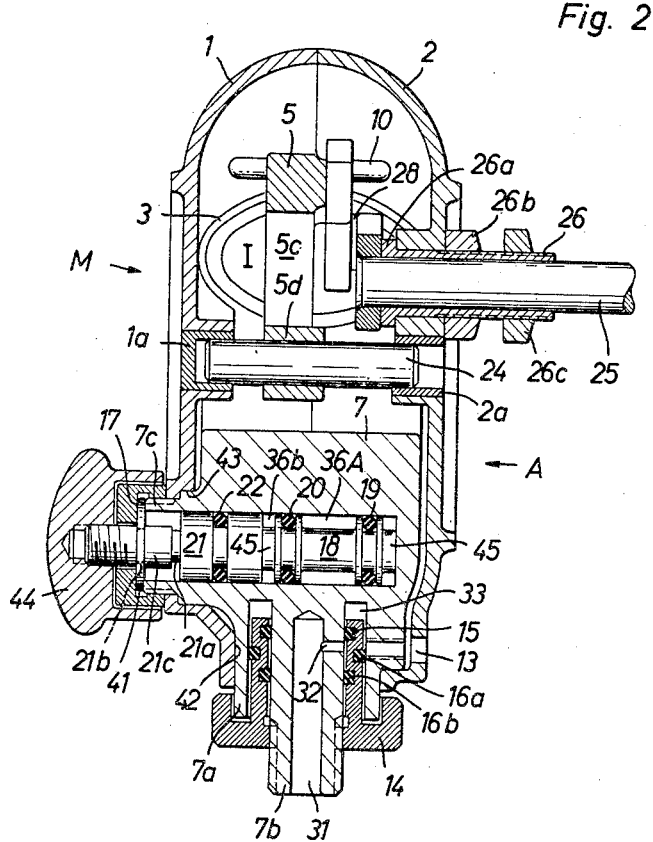
FIG. 2 is a central section taken along the line B—B of FIG. 1, as seen in the direction of arrows.

Referring now in greater detail to the illustrated embodiments, the first to FIGS. 1, 1a and 2, there is shown a motor M which may be utilized, for example, as a means for operating the windshield wipers of an automotive vehicle. The motor comprises a casing which consists of two substantially pan shaped halves or shells 1, 2 having their annular end faces in abutting relationship (see the top of FIG. 2). The shells are releasably connected to each other by two pins 10, 11. The casing receives a substantially segment shaped center support or block 7 which is formed with a first collar 7a projecting radially outwardly through the aperture 42 defined by the shells 1, 2, and with an axially projecting second collar 7c which projects eccentrically through an aperture 43 in the shell 1. The outwardly projecting externally threaded portion of the collar 7c receives a screw cap 17 which bears against the shell 1 and thereby holds the center support 7 in position. The collar 7a is fixed to the shell 2 by a screw (not shown) which passes through an opening 13 in the shell 2 and engages a threaded bore in the support.

The center support 7 has a pair of mutually inclined flat radial end faces 7', 7'' each of which constitutes an end wall for one of two arcuate cylinders 3, 4 consisting, for example, of a suitable slightly elastic synthetic plastic material. The open inner ends of cylinders 3, 4 are articulately connected to the center support 7 and the cylinders extend along the meeting end faces of the shells 1, 2. The open outer ends of cylinders 3, 4 bear against two stops in the form of ribs 8, 9, respectively, which are provided at the inner sides of the shells. The articulate connections between the cylinders 3, 4 and the center support 7 are sealed by resilient packing rings 23. In fact, the cylinders may be simply slipped over the packing rings 23 and over the suitably configurated portions of the center support 7 without being actually fixed thereto. In this manner, the cylinders may expand in longitudinal direction to the extent permitted by the stop means 8, 9, and may expand radially under the action of internal pressures caused by the fluid and by the piston heads. The forces transmitted by cylinders 3, 4 to the stop means 8, 9, respectively, are comparatively small and develop only as a result of friction between the packing rings on the piston heads and the inner cylinder surfaces. The deformation of the cylinders causes them to pivot relative to the support 7 between two extreme positions indicated in FIG. 1a in fully drawn and broken lines respectively.

The cylinder spaces I, II in cylinders 3, 4, respectively, receive heads 5a, 5b forming part of an oscillatable pendulum piston 5. The piston heads 5a, 5b are oscillatable in their respective cylinders in directions toward and away from the end faces 7', 7'' of the center support 7, and each piston head carries a packing ring 29 sealingly engaging with the inner surface of the respective cylinder. The annular gaps sealed by the packing rings 29 between the inner surfaces of the cylinders 3, 4 and the piston heads 5a, 5b, respectively, are of such magnitude that the piston heads never come into actual contact with the cylinders regardless of the extent to which the cylinders are deformed when the fluid motor is in use.

The inwardly extending radial arm 5c of the pendulum piston 5 is formed with a collar 5d which is press fitted or otherwise non-rotatably secured to a pivot axle 24. This pivot axle has an axis which coincides with the common center of curvature of cylinders 3, 4 and is rotatably mounted in bearing sleeves 1a, 2a inserted into the shells 1, 2, respectively. The shell 2 is traversed by an eccentrically mounted sleeve 26 whose inner end is formed with an annular flange 26a bearing against the inner side of the shell 2. The sleeve 26 is externally threaded to receive a pair of lock nuts 26b, 26c. The nut 26b bears against the outer side of the shell 2 and the sleeve 26 may extend through a suitable aperture formed in the chassis (not shown) of an automotive vehicle above or below the windshield to be maintained in requisite position by the second lock nut 26c.

The sleeve 26 rotatably receives a driven output shaft 25 whose inner end extends into the casing and is press fitted or otherwise non-rotatably secured in the eye 27a at one end of a radial link 27. The outwardly extending end of the output shaft 25 is connected to a windshield wiper (not shown). The outer end of the link 27 carries a follower pin 28 which extends into a U-shaped entraining or rocking member 6 forming part of or rigidly secured to the piston 5. Thus, whenever the piston oscillates about the pivot axle 24, i.e. about the common center of curvature of cylinders 3, 4 the entraining means 6 rocks the link 27 through the follower pin 28 and imparts a corresponding oscillatory movement to the output shaft 25. By the eccentric mounting of the output shaft 25 with respect to the pivot axle 24, the angular speed and the angle between the two end positions of the shaft 25 are increased. Oscillatory movements of the pendulum piston 5 bring about corresponding sweeping movements of the windshield wiper or any other driven means connected with the output shaft 25.

Figure 3:
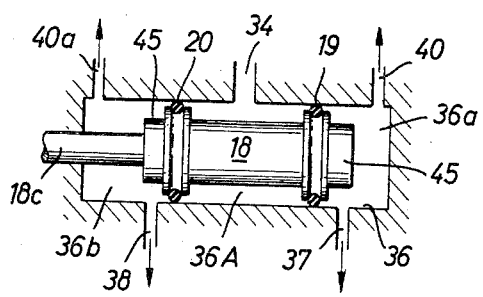
FIG. 3 is a schematic section through the fluid flow regulating system of the motor.

One form of the means for alternately delivering pressure fluid into the cylinder spaces I, II to bring about oscillatory movements of the pendulum piston 5 is shown mainly in FIGS. 2, 3, and in part in FIG. 1. A nipple 7b which is coaxially surrounded by the collar 7a of the center support 7 may be connected to a source of pressure fluid, e.g. compressed air (shown in FIG. 4). The pressure fluid flows through the bore 31 in the nipple 7b and into a radial duct 32 which is sealable by an adjusting nut 14, the latter being screwed onto the nipple 7b and extending into the annular space 33 between the parts 7a, 7b. When the nut 14 is in one of its extreme axial positions which is shown in FIG. 2 of the drawings, it completely seals the duct 32 from the annular space 33 and thus prevents the flow of pressure fluid into the motor. The nut 14 carries two internal resilient packing rings 15, 16b and an external packing ring 16a, the latter preventing entry of atmospheric air into the annular space 33 or the discharge of compressed fluid from said space. The ring 16b seals the duct 32 from the atmosphere and, in the position of FIG. 2, the ring 15 seals the duct 32 from the space 33.

By rotating the nut 14 in a direction to move the packing ring 15 over and outwardly beyond the discharge end of the duct 32, the pressure fluid is free to flow into the annular space 33, into a second duct 34 formed in the body of the center support 7 (see FIG. 1), and thence into a cylindrical bore 36 which latter is coaxial with the collar 7c (FIG. 2). The bore 36 receives a double acting control valve 18 whose longitudinal ends mount a pair of resilient sealing rings 19, 20, these rings defining therebetween an annular chamber 36A which communicates with the aforementioned duct 34, i.e. it is filled with a pressure fluid.

Two spaced points of the bore 36 communicate with two channels 37, 38 which lead to the cylinder spaces I, II and have their discharge ends in the end faces 7', 7'', respectively. A pair of conduits 40, 40a connects the bore 36 with the open sides of the cylinder spaces I, II at such points which are within the enclosed portion of the respective cylinder space when the piston heads 5a, 5b are in their outermost positions, i.e. the non-illustrated terminals of conduits 40, 40a communicate with the interior of cylinders 3, 4 close to the stop means 8, 9, respectively. However, the spacing of the terminals of conduits 40, 40a from the open ends of their cylinders 3, 4 is such that they may communicate with the atmosphere after the one or the other of the piston heads 5a, 5b travels a very short distance in the direction toward the center support 7. In other words, the terminals of conduits 40, 40a will be sealed from the atmosphere only when the piston heads 5a, 5b respectively, assume their outermost positions most distant from the end faces 7', 7'', respectively.

To start the operation of the fluid motor M, the shifting or starter plunger 21 which is reciprocable in the bore 36 is moved along the coaxial stem 18c of the control valve 18 to shift the latter in a direction to the right of FIG. 3 and into an end position in which the valve 18 permits the flow of pressure fluid from the duct 34 through the annular chamber 36A and into the channel 37. The piston head 5a in the cylinder space I which is assumed to be in its innermost position is then subjected to pressure and travels in an outward direction toward the stop means 8 until it closes and thereupon passes over the orifice of the conduit 40 which latter, up to such time, was open to atmosphere through the open outer end of the cylinder 3 and, consequently, the right-hand end face of the valve 18 was not under fluid pressure. However, as soon as the piston head 5a passes over and beyond the orifice of the conduit 40 substantially into the position of FIG. 1, the conduit 40 communicates with the sealed portion of the cylinder space I and receives pressure fluid, the fluid then flowing back into the bore 36, i.e. into the pressure compartment 36a at the right-hand side of the valve 18 and causing the valve to move in a direction to the left so as to connect the annular chamber 36A with the channel 38 whose discharge end is located in the end face 7''. Since the conduit 40a communicates with the atmosphere when the piston head 5a moves in a direction away from the end face 7', no pressure exists in the pressure compartment 36b at the left-hand side of the valve 18, and the valve thus cannot resist the pressure of fluid in the compartment 36a. As soon as the fluid is free to flow through the channel 38, the piston 5 begins a stroke in the opposite (clockwise) direction and the terminal of the conduit 40 is again connected with atmosphere because the piston head 5a now travels in a direction toward the end face 7', i.e. no pressure exists in the compartment 36a. When the piston head 5b reaches the outermost end of its stroke, it passes over the terminal of the conduit 40a and permits the flow of pressure fluid from the cylinder space II into the compartment 36b, thereby causing the valve 18 to move in a direction to the right and to again permit the flow of pressure fluid into the channel 37. The cycle is then repeated in the same manner and the piston 5 is alternately rocked in clockwise and counterclockwise directions until the valve 18 is intentionally moved into the neutral position of FIG. 3 in which the sealing rings 19, 20 prevent the flow of pressure fluid into the channels 37 and 38, i.e. the spacing of points at which the channels 37, 38 communicate with the bore 36 is such that the valve 18 may assume a position between said points so that the chamber 36A cannot communicate with either of channels 37, 38.

Alternately, the movements of the piston 5 may be brought to a halt by turning the sealing nut 14 into the position of FIG. 2 in which the nut prevents passage of pressure fluid from the source to the bore 36 and chamber 36A. In the neutral position of the control valve 18 are shown in FIG. 3, the channel 37 and the conduit 40 communicate with each other but are sealed from the duct 34. Similarly, the channel 38 and the conduit 40a communicate with each other but are also sealed from the duct 34. When the fluid motor M is in operation, one of the channels 37, 38 must be sealed from the conduit 40, 40a, respectively.

The shifting plunger 21 is provided with an annular packing 22 which seals the pressure compartment 36b from the atmosphere. Its stem 21c is provided with two spaced annular notches 21a, 21b each of which may receive a resilient member 41 to releasably hold the plunger 21 in one of two extreme positions, one such extreme position being shown in FIG. 2. The stem 21c may be shifted with the plunger 21 against the retaining action of the resilient member 41 by a knob-shaped handgrip member 44 which is connected to the outer end of the plunger stem 21c externally of the center support 7 and surrounds the cap 17. Suitable spacer means 45 are provided in the compartments 36a, 36b to prevent excessive axial displacements of the valve 18. The spacer means 45 in the compartment 36b prevents the valve 18 from coming into abutment with the plunger 21 and from reducing the volume of the compartment 36b below a minimum magnitude. When the resilient member 41 is received in the notch 21b, the plunger 21 maintains the valve 18 in the end position of FIG. 2; the other end position of the valve is determined by the plunger when the resilient member 41 enters the notch 21a.

Figure 3A:
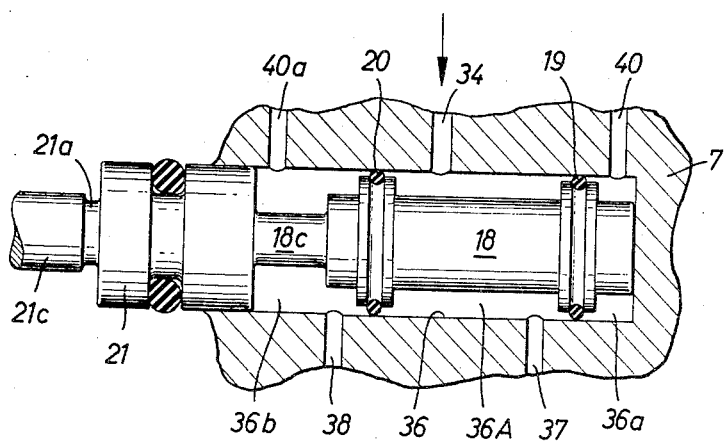
FIG. 3a illustrates a modified fluid flow regulating system.

In the above described fluid motor M, oscillatory movements of the pendulum piston 5 may be arrested in any desired position of the piston, i.e. also in such position in which the piston heads 5a, 5b do not complete their forward or return stroke. This is due to the fact that the distance between the points at which the channels 37, 38 communicate with the bore 36 is such that the chamber 36A may be simultaneously sealed from both channels (see FIG. 3). In other words, the distance between the intake ends of channels 37, 38 is greater than the distance between the sealing rings 19, 20. However, if the improved fluid motor is utilized to operate a windshield wiper, it is desirable that the latter be arrested in one of its extreme positions. This can be attained by a slight modification of the fluid flow regulating means as illustrated in FIG. 3a in which the spacing between the sealing rings 19 and 20 is the same as that of the points at which the channels 37, 38 communicate with the bore 36 so that one of said channels always communicates with the chamber 36A. If the operator desires to stop the motor, he shifts the valve 18 into one of its end positions whereby the pressure fluid flowing into one of the channels 37, 38 moves the piston 5 into the corresponding extreme position together with the windshield wiper which latter receives motion from the output shaft 25 over the motion transmitting means 6, 27, 28 which connects the output shaft with the piston 5. The diameters of the spacer means 45 in the compartments 36a, 36b correspond to the diameter of the valve 18 between the sealing rings 19, 20, i.e. the end faces of the valve at both sides of the rings 19, 20 are of the same area.

Figure 4:
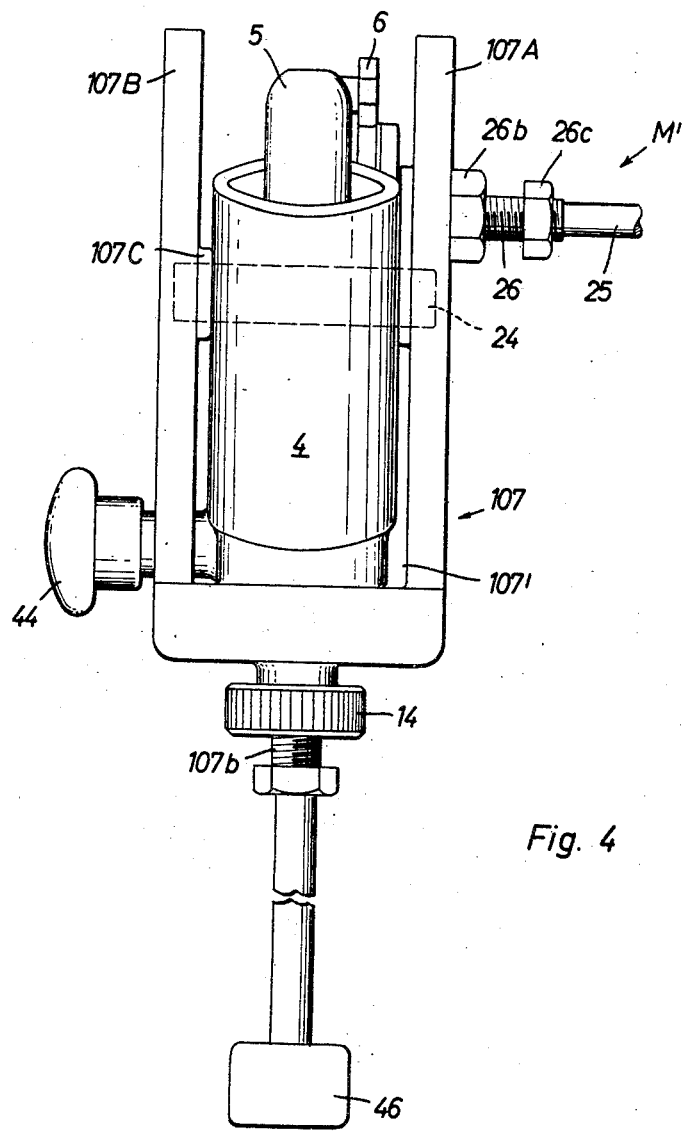
FIG. 4 is an end view of a modified fluid motor in which the pivot axle of the piston is mounted in the center support.

When the motor M is required to produce a high output its substantially segment shaped center support 7 may be provided with bifurcated extension means as is shown in FIG. 4. The modified motor M' comprises a center support 107 which is formed with two mutually inclined end faces (only the end face 107' shown) to which are connected the aforedescribed hollow arcuate cylinders. The center support 107 has an inwardly projecting extension 107C which rockably mounts the piston 5 in the manner not fully shown in FIG. 4, for example, by receiving the pivot axle 24 which extends through the eye of an arm corresponding to the arm 5c shown in FIG. 1. The axis of the pivot axle 24 coincides with the common center of curvature of the cylinders. The nipple 107b is connected to a schematically illustrated source of hydraulic or pneumatic fluid, e.g. an air compressor 46 or the like. The cylinders and the piston 5 are received between a pair of substantially plate-like parallel extensions 107A, 107B which constitute a bifurcated portion of the center support 107.

The arrangement of FIG. 4 brings about a more favorable transfer of forces between the cylinders and the piston heads, despite the fact that the casing (not shown in FIG. 4) may be one of very light-weight design. Actually, the motor M' may operate without any casing, if desired.

Figure 5:
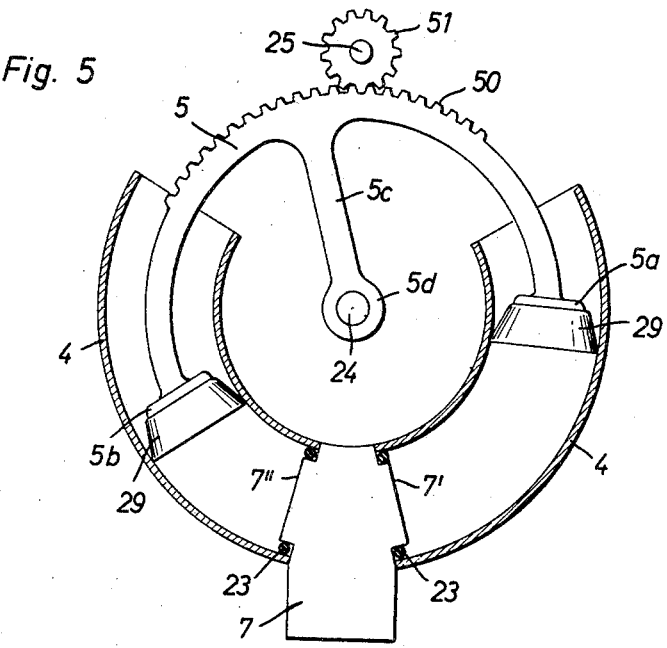
FIG. 5 is a plan view of a motor in which the output shaft is driven by a segmental rack fixed to the piston.

The motion transmitting means 6, 27, 28 operating between the piston 5 and the output shaft 25 may be modified in the manner shown in FIG. 5. The piston 5 is formed with a segmental rack 50 whose teeth mesh with the teeth of a pinion 51 which is drivingly connected to the output shaft 25. This shaft need not necessarily be mounted on the casing of the fluid motor or on the center support but may be mounted on the automobile chassis if the motor is utilized to operate a windshield wiper. The transmission ratio between the piston 5 and the output shaft 25 may be selected in such a way that the pinion 51 completes several revolutions for each oscillation of the piston.

Figure 6:
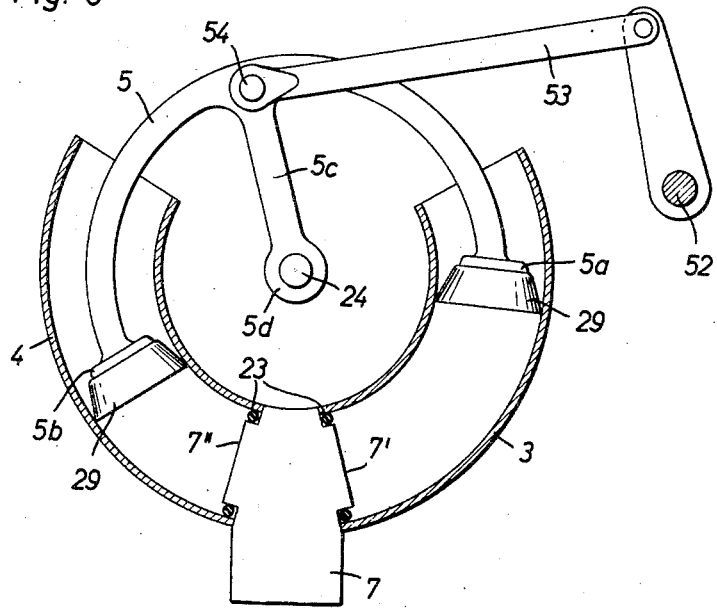
FIG. 6 is a plan view of a different motion transmitting arrangement which comprises a connecting rod.

According to a further modification of my invention, the piston 5 may generate continuous rotary motion in clockwise or anticlockwise direction As is shown in FIG. 6, the output shaft 52 is then formed as a crankshaft and is driven by one end of a connecting rod 53 whose other end is fixed to a driving pin 54 carried by the piston 5.

The invention is, of course, not limited to the specific embodiments described and illustrated but may be modified in various details without departing from the spirit and scope of the appended claims.

I claim:
1. A fluid motor, comprising, in combination, a support member having two face portions; two cylinder members each defining a cylinder space having an arcuate axis, and having at least one open axial end portion; means for respectively securing said cylinder members to said face portions for sealing engagement of said face portions with said open end portions and for pivotal movement of each end portion relative to said support about a pivot axis transverse of the arcuate axis of the corresponding cylinder space; means for limiting said pivotal movement; two piston members respectively mounted in said spaces for arcuate axial movement toward and away from said face portions; and means for admitting pressure fluid to said spaces in coordinated sequence.

2. The fluid motor as set forth in claim 1, wherein said piston members are fixedly connected to constitute a pendulum piston having two heads.

3. The fluid motor as set forth in claim 2, wherein said arcuate axes have a common center of curvature and further comprising a casing receiving said cylinder members and said support member; and a pivot axle for said piston rotatably mounted in said casing, said pivot axle having an axis coinciding with the center of curvature of said arcuate axes.

4. The fluid motor as set forth in claim 2, wherein said arcuate axes have a common center of curvature and said arcuate piston is oscillatable about said center of curvature, further comprising a casing receiving said cylinder members and said support member, said movement limiting means including stop means supported by said casing for radial abutting engagement with the other axial end portions of said cylinder members respectively.

5. The fluid motor as set forth in claim 2, wherein said arcuate axes have a common center of curvature located in said center support and further comprising a pivot axle for said piston, said pivot axle being mounted in said support member and having an axis coinciding with the center of curvature of said arcuate axes.

6. The fluid motor as set forth in claim 2, further comprising a sealing member on each of said piston heads and the cylinder members defining annular gaps therebetween said sealing members being of elastic material and interposed in said gaps between said cylinder members and said piston heads 7. The fluid motor as set forth in claim 1, wherein said last mentioned means is mounted in said support member.

8. The fluid motor as set forth in claim 1, wherein said means for admitting pressure fluid includes a source of pressure fluid, and valve means communicating with said source, with respective first portions of said cylinder spaces contiguously adjacent said face portions, and with respective second portions of said cylinder spaces axially spaced from said first portions for selectively connecting said first cylinder space portions to said pressure source and to the respective second cylinder space portions responsive to a pressure difference between said second cylinder space portions.

9. A fluid motor comprising, in combination, a substantially segment shaped center support having mutually inclined first and second end faces; a first and a second arcuate cylinder, said cylinders having a common center of curvature and each having a first and a second open end, means for articulately connecting said first ends to said center support in sealing engagement with said first and second end face, respectively for pivotal movement of said cylinders relative to said center support; first and second stop means adjacent to the second end of said first and second cylinder, respectively for limiting said pivotal movement; a pendulum piston mounted for pivotal movement about said center of curvature and comprising a first and a second head including means sealingly received in said first and second cylinder, respectively, said piston extending through said open second ends; a source of pressure fluid; and means for alternately delivering fluid into said cylinders to bring about oscillatory movements of said piston, said last mentioned means comprising a bore formed in said center support and communicating with said source, a first and a second channel formed in said center support, said channels communicating with spaced points of said bore and terminating in said first and second end face, respectively, first and second conduit means each communicating with said bore and each having a terminal communicating with and adjacent to the second end of said first and second cylinder, respectively, said conduits normally communicating with atmosphere, and being sealed from atmosphere by the piston heads when the piston heads assume positions most distant from the respective end faces, and a control valve axially shiftably received in said bore and defining a chamber in said bore in communication with said source, said chamber alternately communicating with said first and second channel in response to reciprocatory movements of the valve in said bore.

10. The fluid motor as set forth in claim 9, wherein said valve is reciprocable between a first and a second end position and the spacing of points at which said channels communicate with said bore is such that one of said channels always communicates with said chamber, and further comprising means for shifting said valve into one of said end positions.

11. The fluid motor as set forth in claim 10, wherein said shifting means comprises a plunger reciprocably received in said bore and handgrip means connected with and adapted to reciprocate said plunger for thereby moving the valve into said one end position.

12. The fluid motor as set forth in claim 11, further comprising resilient means for releasably holding said plunger in a position corresponding to at least one end position of said valve.

13. The fluid motor as set forth in claim 9, further comprising means for sealing said bore from said source.

14. The fluid motor as set forth in claim 9, wherein the spacing of points at which said channels communicate with said bore is such that the valve is movable into a position between said points in which the chamber is sealed from said first and from said second channel.

15. A fluid motor, comprising, in combination, a support member having two face portions; two cylinder members each defining a cylinder space having an arcuate axis, and having at least one open axial end portion; means for respectively securing said cylinder members to said face portions for sealing engagement of said face portions with said open end portions and for pivotal movement of each end portion relative to said support about a pivot axis transverse of the arcuate axis of the corresponding cylinder space; two piston members respectively mounted in said spaces for arcuate axial movement toward and away from said face portions; and means for admitting pressure fluid to said spaces in coordinated sequence.

References Cited in the file of this patent
UNITED STATES PATENTS

| | | |
|---|---|---|
| 1,006,157 | Weber et al. | Oct. 17, 1911 |
| 1,051,054 | Anderson | Jan. 21, 1913 |
| 2,471,285 | Rice | May 24, 1949 |

FOREIGN PATENTS

| | | |
|---|---|---|
| 169,795 | Switzerland | Sept. 1, 1934 |
| 461,892 | France | Nov. 10, 1913 |